United States Patent Office 3,350,012
Patented Oct. 31, 1967

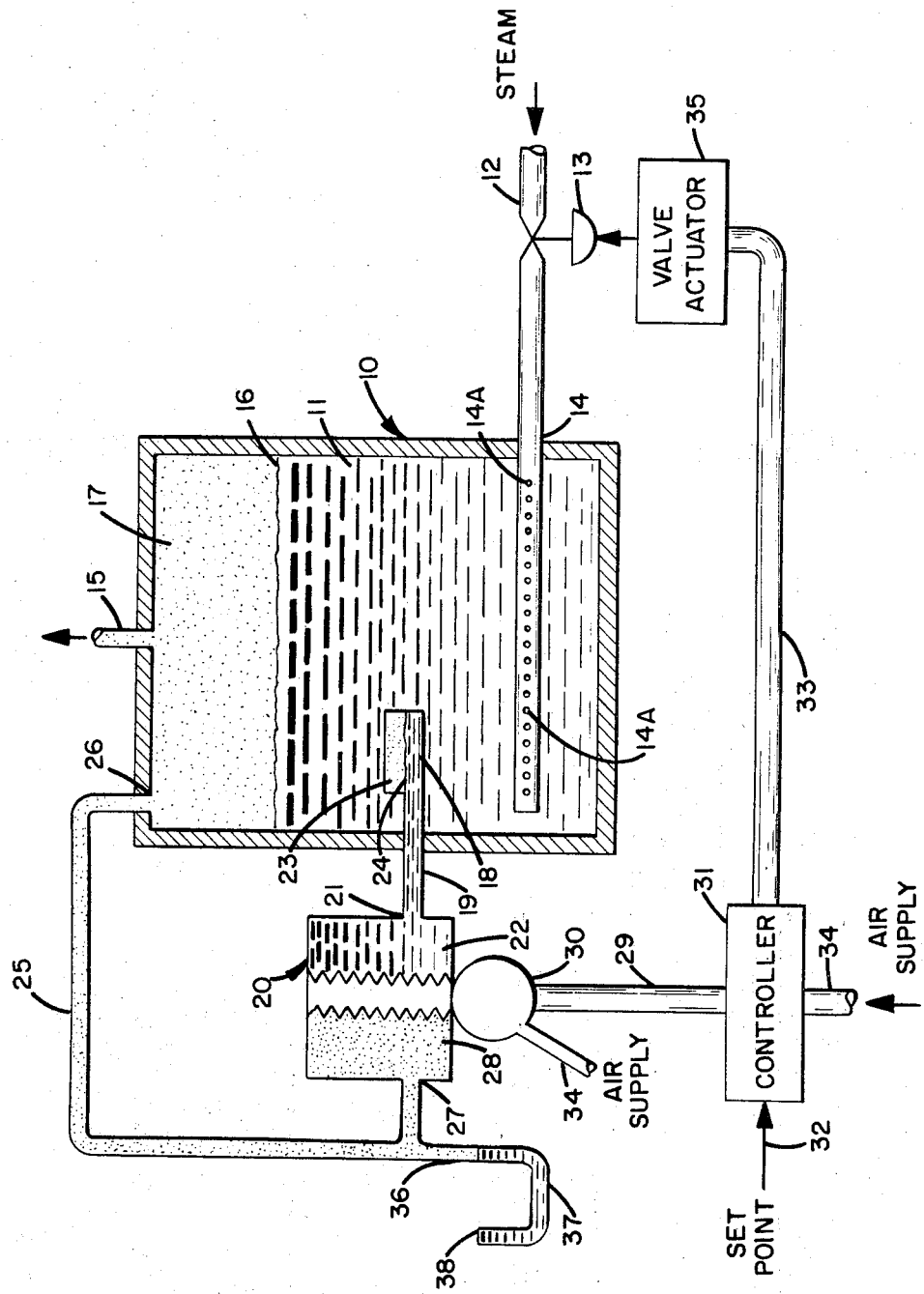

3,350,012
BOIL CONTROL SYSTEM
J Walter Choquette, Jr., South Attleboro, and Walter H. Ridley, Foxboro, Mass., assignors to The Foxboro Company, Foxboro, Mass., a corporation of Massachusetts
Filed Sept. 27, 1965, Ser. No. 490,252
5 Claims. (Cl. 236—17)

ABSTRACT OF THE DISCLOSURE

The boiling rate of an aqueous solution is accurately controlled by varying the heat input to a vat having a restricted outlet to atmosphere for vapors therein, in accordance with the difference between the vapor pressure above the surface of the boiling medium and the effective vapor pressure at a point within the boiling medium which is determined by the temperature of the boiling medium at that point.

This invention relates to apparatus and method for boil control and more particularly to a means for controlling the exact boiling ebullition required in an industrial process.

An object of this invention is to provide apparatus for regulating the ebullition of a liquid solution to a predetermined amount of agitation.

Another object of this invention is to provide a boiling temperature control having barometric compensation.

Another object of this invention is to provide a means of accurately controlling the boiling rate of a liquid solution.

Another object of this invention is to provide barometric compensation to a boiling control apparatus based upon the pressure above the surface of the boiling medium.

Another object of this invention is to provide a simple, efficient, economical and accurate means of controlling the rate of boil of an aqueous solution.

Another object of this invention is to provide an accurate means of controlling boiling temperature with sufficient temperature discrimination to provide a useful boiling rate control signal compensated by atmospheric pressure above the boiling medium.

These and other features and advantages of the invention will be in part pointed out and in part apparent from the following description, taken in conjunction with the accompanying sole figure which is a block diagram of the boil control system.

Referring now to the figure, vat 10 contains illustratively an aqueous solution 11 which is required to be maintained at a predetermined rate of boiling. It is to be understood that the invention may apply to any liquid concentration to control its boiling. In an illustrative application for dyeing materials to be passed through aqueous solution 11, the actual boiling characteristics of the aqueous solution employed will differ from the boiling characteristics of water by less than 1° F. For typical dyeing ingredients employed in the aqueous solution, there will be a molal elevation of boiling point of about .92° F. for a 1 molal solution. The dye solution concentration in practice is much less than 1 molal.

Steam inlet pipe 12 controlled by valve 13 introduces steam into vat 10 via perforated section of pipe 14. Steam is emitted from perforations 14A, thereby heating aqueous solution 11 to a temperature determined by the amount of heat introduced into vat 10 balanced by the amount of heat withdrawn from vat 10 through vapor vent 15 and other heating losses. It is to be understood that any method of heating may be used as found convenient, such as a heating coil without perforations for heating non-aqueous compositions.

In operation, the liquid level 16 of aqueous solution 11 is maintained at a desired point by conventional means not shown, such as periodically refilling vat 10 as required. Above level 16 of the aqueous solution, the remaining area 17 in vat 10 is occupied by vapor of the aqueous solution. The pressure in area 17 is determined by barometric pressure and the rate of vapor emission from boiling aqueous solution 11 and the amount of vapor draw-off permitted through the restriction of vent 15.

Positioned within the aqueous solution 11 of vat 10 is a temperature bulb 18 connected by capillary 19 leading from the vat to a differential pressure measuring device 20. Bulb 18 is connected by capillary 19 to one side of differential pressure measuring device 20 at inlet 21, thereby connecting into chamber 22 thereof. Bulb 18, capillary 19 and chamber 22 are filled with a liquid filler equivalent in boiling characteristics to the liquid in the tank, illustratively distilled water when the tank contains an aqueous solution less than 1 molal concentration, except for a small amount of saturated vapor of the liquid filler located in the upper half of bulb 18. Saturated vapor portion 23 within bulb 18 is of a volume and pressure such as to locate the level 24 of the liquid filler within bulb 18 at approximately the mid-point of the bulb under the operating conditions within vat 10.

Pressure compensation is obtained from line 25 connected to vat 10 at inlet 26 opening on to vapor area 17. The pressure in area 17 is conducted by line 25 to inlet 27 of differential pressure device 20 connecting to chamber 28 therewithin. Differential pressure measuring device 20 is of known type construction and operates conventionally whereby the output 29 of the differential pressure measuring device 20 is proportional to the difference in pressure between the two inputs 21 and 27 thereto. Output 29 may be in the form a pneumatic pressure produced by differential pressure transmitter 30 corresponding to the pressure difference measured by differential pressure cell 20. Output 29 may also conveniently be an electrical signal. Output 29 is supplied to controller 31, which has a set point control 32. The controller output 33 is such as to reduce the error between output 29 and set point 32. Controller output 33 is supplied to valve actuator 35, regulating valve 13 and the amount of steam introduced through pipe 12 and perforated section 14 thereof into the liquid 11 of vat 10. In this manner a feedback loop is formed in which the heating control of vat 10 is altered in a direction so as to reduce the error determined by controller 31 relative to its set point 32. Controller 31 may conveniently be a conventional pneumatically operated controller having proportional and integral modes of operation.

U-tube 36 is connected to line 25 near differential cell inlet 27. U-tube 36 in operation will contain in its lower portion vapor condensate 37 from line 25 which originates from area 17 of vat 10. U-tube 36 allows liquid condensate 37 to egress through its open end 38. In this manner, line 25 is prevented from building up any static head owing to liquid condensation within line 25 and thereby only transmits to differential pressure cell 20 the actual vapor pressure at inlet 26 of line 25 derived from vapor pressure area 17 within vat 10.

In operation, the boiling temperature of the aqueous solution may vary over several degrees Fahrenheit according to the pressure within vat 10 in area 17 above the liquid level 16, and the boiling rate of the aqueous solution itself. The span of the differential pressure measuring device 20 may be conveniently approximately 3° F. so as to obtain maximum sensitivity of control. A small change in temperature, will have a large effect on the ebullience or boiling rate of aqueous solution 11. A small change in pressure within vat 10 will similarly have a large effect on the ebullience.

So long as the vapor content at the surface of the boiling medium is held to a constant amount by the equilibrium of venting through vent 15 from the vat 10, then if the difference between the vapor pressure in bulb 18, that is to say, the temperature of the boiling medium, and the pressure above the boiling level of the medium is maintained at a constant difference, the ebullience will be maintained at a constant rate. This difference corresponds to the tendency of ebullience of vapor from within the medium through its surface.

Should the pressure in area 17 alter due to change in atmospheric pressure, the change will be transmitted through line 25 to differential pressure measuring device 15 and the output from 29 will be compensated by this pressure change to provide a new output, determining an error which will change the steam input into vat 10. This change will be such that the ebullience will be maintained constant though the pressure in area 17 of vat 10 has changed somewhat. Similarly, should the temperature of the aqueous solution 11 change, as measured by bulb 18, the output of differential pressure measuring device 20 will determine a new controller 31 output 33, altering the steam rate supplied to vat 10 so as to return to the desired boiling temperature. It is important in operation to have the vapor emission through vent 15 in an equilibrium condition wherein the combination of vent 15 restriction and area 17 pressure produces a constant emission, so that the influence of vapor content in area 17 upon boiling rate is minimized. This influence can be relatively large should the vapor content vary.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. In an industrial process employing a boiling liquid medium in a container having a regulatable heating means therefor and having restricted means for venting vapors from said boiling liquid medium to atmosphere, control apparatus comprising:
a differential pressure measuring device having a first input responsive to a pressure related to the pressure of the vapor above the surface of said boiling liquid medium and having a second input responsive to a pressure corresponding to a temperature within said boiling liquid medium and having an output representing the difference in pressure between said first input and said second input, and
control means responsive to said output for controlling said regulatable heating means.

2. In an industrial process employing a boiling liquid medium in a container having a regulatable heating means therefor, control apparatus comprising:
pressure-conducting means inter-connected with said container at a point above the level of said liquid medium therein and being responsive to the pressure above the level of said liquid medium in its boiling state,
a bulb positioned within said liquid medium partly filled with a liquid filler substantially equivalent in boiling characteristics to said liquid medium and having the portion above said liquid filler containing a saturated vapor of said liquid filler,
a capillary filled with said liquid filler interconnected with said bulb,
a differential pressure measuring device having a first input interconnected with said capillary and having a second input responsive to said pressure-conducting means and having an output representing the difference in pressure between the pressure conducted by said pressure-conducting means and said capillary, and
control means having a set point adjustment therefor and having an input responsive to said output of said differential pressure measuring device and having an output supplied to said regulatable heating means representing the deviation of said output of said differential pressure measuring device from said set point.

3. The apparatus of claim 2 with a condensate trap interconnected with said pressure-conducting means.

4. The apparatus of claim 2 with a condensate trap interconnected with said second input of said differential pressure measuring device.

5. The apparatus of claim 2 having said differential pressure measuring device adapted to a narrow span related to the range of boiling temperatures of said liquid medium.

References Cited
UNITED STATES PATENTS

| | | | |
|---|---|---|---|
| 1,328,277 | 1/1920 | Fulton | 236—18 |
| 2,296,325 | 9/1942 | Bak | 236—18 |
| 2,490,533 | 12/1949 | McAlear | 236—92 X |

EDWARD J. MICHAEL, *Primary Examiner.*